United States Patent Office 2,931,795
Patented Apr. 5, 1960

2,931,795
MONOAZO DYESTUFFS

Alphonse Heckendorn, Basel, Alfred Fasciati, Bottmingen, and Heinrich Zollinger, Binningen, Switzerland, assignors to Ciba Limited, Basel, Switzerland, a Swiss firm No Drawing. Original application July 25, 1955, Serial No. 524,274, now Patent No. 2,889,316, dated June 2, 1959. Divided and this application June 27, 1958, Serial No. 746,578

Claims priority, application Switzerland July 30, 1954

4 Claims. (Cl. 260—199)

This invention provides monoazo-dyestuffs of the type of the dyestuff of the formula (I)
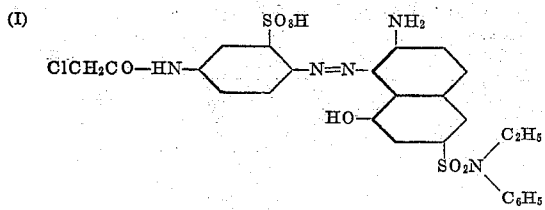

The monoazo-dyestuffs of this invention correspond to the general formula (2) $\quad$ R—N=N—$R_1$—X in which R represents the radical of an aminonaphthalene sulfonic acid amide bound to the azo linkage in a position vicinal to the amino group, $R_1$ represents the radical of a diazo-component of the benzene series, and X represents a substituted amino group containing an aliphatic halogen acyl group having a reactive halogen atom, and in which the radical —$R_1$—X contains a group imparting solubility in water, advantageously a sulfonic acid group.

The invention also includes a process for the manufacture of these monoazo-dyestuffs, wherein an aminonaphthalene sulfonic acid amide is coupled in an acid medium with a diazo compound of an amine of the formula (3) $\quad$ $H_2N$—$R_1$—X in which the symbols $R_1$ and X have the meanings given above.

As coupling components of the aforesaid kind there may be mentioned, for example:

1-aminonaphthalene-4-sulfonic acid-N-methyl-anilide,
1-aminonaphthalene-5-sulfonic acid methylamide,
1-aminonaphthalene-5-sulfonic acid N-methyl-anilide,
2-aminonaphthalene-6-methyl- or -ethyl- or -para-tolyl- or -phenyl-sulfone,
2-aminonaphthalene-5- or -6- or -7- or -8-sulfonic acid amide,
2-aminonaphthalene-3:6- or -5:7-disulfonic acid amide,
2-amino-8-hydroxynaphthalene-3:6-disulfonic acid amide,
2-amino-3- or -5-hydroxynaphthalene-7-sulfonic acid amide,
2-methylamino-,
2-β-hydroxyethylamino- or 2-phenylamino-8-hydroxynaphthalene-6-sulfonic acid amide, and advantageously 2-amino-8-hydroxynaphthalene-6-sulfonic acid amide and 2-amino-8-hydroxynaphthalene-6-sulfonic acid methyl or ethyl or β-hydroxyethyl- or β-hydroxypropyl or 3'-methoxy-propyl- or -cyclohexl- or -phenyl- or -dimethyl- or -diethyl- or N-methyl-phenyl- or N-ethylphenyl or N-methyl-N-β-hydroxyethyl amide.

The amines of the Formula 3 which are used as starting materials in the present process can be made by methods in themselves known, for example, by condensing 1 molecular proportion of an amine which contains a sulfonic acid group and in addition to the diazotizable amino group a reactive hydrogen atom bound to a nitrogen atom, with one molecular proportion of an aliphatic halogenated carboxylic acid halide. In the halogenated acid group the halogen atom is reactive and splits off easily in alkaline media. Advantageously, the halogen atom is present in the β-position or advantageously the α-position of an aliphatic acyl radical. As reactive halogen-compounds suitable for preparing the amines of the Formula 3 there may be mentioned: alphatic acid halides such as β-chloropropionyl chloride, sulfo-chloracetic acid chloride, chloracetyl chloride, chlorethane sulfonyl chloride, or chloromethane sulfonyl chloride.

The condensation with the acid halides is advantageously carried out in the presence of an acid-binding agent such as sodium carbonate. In all these reactions it will be understood that they are carried out in such manner that the finished product still contains a reactive halogen atom.

Especially valuable monoazo-dyestuffs are obtained from the condensation products of 1 molecular proportion of 2:5-diaminobenzene-1-sulfonic acid or 2:4-diaminobenzene-1-sulfonic acid with 1 molecular proportion of chloropropionyl chloride or chloracetyl chloride.

The amines used as starting materials in the present process can be diazotized by methods in themselves known, for example, with the aid of a mineral acid especially hydrochloric acid and sodium nitrite or by one of the methods customarily used for compounds difficult to diazotize, for example, with the aid of nitrosyl-sulfuric acid. In the latter case it is often of advantage to couple the diazo-compounds, after diluting the diazotization mixture with water to precipitate the compound and filtering it off. Coupling is carried out in an acid medium, for example, a medium which is weakly acid to Congo to an acetic acid medium. It is often advisable to neutralize the mineral acid set free by the coupling reaction, for example, with sodium acetate.

The dyestuffs are isolated from the coupling medium in such manner that the isolated product still contains a reactive halogen atom.

The new dyestuffs of the above general Formula 2 can also be obtained by a modification of the process, wherein one molecular proportion of a monoazo-dyestuff of the formula (5) $\quad$ R—N=N—$R_1$—Z in which R represents the radical of an aminonaphthalene sulfonic acid amide bound to the azo group in a position vicinal to the amino group, $R_1$ represents the radical of a diazo-component of the benzene series, and Z represents an amino group containing at least one reactive hydrogen atom, is condensed with a reactive aliphatic halogen acyl compound which contains more than one reactive halogen atom and, if the initial dyestuff contains no free sulfonic acid group, a group imparting solubility in water, advantageously a sulfonic acid group.

The monoazo-dyestuffs of the Formula 5 used as starting materials can be prepared by methods in themselves known by coupling one of the coupling components mentioned above in an acid medium with a diazo-compound which contains, in addition to the diazo-group a substituent convertible into a free amine group, and converting the said substituent into an amino group after the coupling.

As examples of such diazo-compounds there may be mentioned those obtainable from the following amines: 3- or 4-nitro-1-aminobenzene, 4-nitro-4'-aminodiphenyl and the diamines mentioned above or their monoacyl-compounds.

The condensation of the monoazo-dyestuffs of the Formula 5 so obtained with the appropriate reactive halogen-compounds, of which the more easily accessible have been mentioned above, is advantageously carried out in the presence of an acid-binding agent, such as sodium acetate, and under conditions such that a reactive halogen atom remains in the resulting dyestuff condensation product, that is to say, for example, in an organic medium or at a lower temperature in an aqueous medium.

The dyestuffs of this invention are new. They are suitable for dyeing and printing a very wide variety of materials, especially those of animal origin such as leather, silk and above all wool, and also various artificial fibers, for example, of animalized artificial silk, superpolyamides or superpolyurethanes, etc. The dyeings and prints obtainable with these dyestuffs from neutral or weakly acid baths are distinguished by their valuable tints, their level character, their good fastness to light and their very good fastness to washing and fulling, especially under alkaline conditions.

The following examples illustrate the invention, the parts and percentages are by weight unless otherwise stated, and the relationship of parts by weight to parts by volume is the same as that of the kilogram to the liter:

Example 1

A solution of 26.45 parts of 4-chloracetylamino-2-aminobenzene-1-sulfonic acid in 400 parts of water is mixed with 30 parts of hydrochloric acid of 30 percent strength, and diazotized at 5–10° C. in the usual manner with 25 parts by volume of a 4 N-solution of sodium nitrite. The diazo-compound free from nitrous acid is mixed with sodium acetate until the solution is only weakly acid to Congo, and then with a suspension obtained by dissolving 32.8 parts of 2-amino-8-hydroxy-naphthalene-6-sulfonic acid N-methyl-anilide in 100 parts by volume of a 1 N-solution of sodium hydroxide and acidifying with 100 parts by volume of 2 N-acetic acid. The whole is stirred at about 20° C. until coupling is complete, the precipitated dyestuff is filtered off and washed with sodium chloride solution of 1 percent strength. After being dried in vacuo the dyestuff which in its free acid form corresponds to the formula

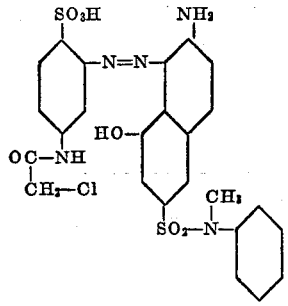

is a brown-red powder which dissolves in hot water with a yellow-red coloration and dyes wool or fibers of superpolyamides yellowish red tints which are fast to washing and fulling.

A dyestuff yielding more bluish red tints, which in its free acid form corresponds to the formula

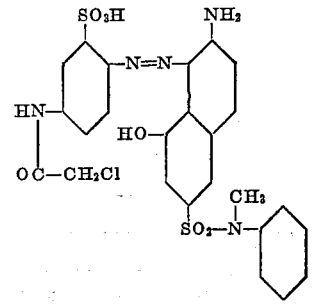

is obtained by diazotizing 5-chloracetylamino-2-aminobenzene-1-sulfonic acid and coupling the diazo-compound with the coupling component used above.

Similar dyestuffs, which dye wool from neutral or acetic acid baths the tints given in column III of the following table are obtained, by using in the above example the diazo-components and coupling components mentioned in columns I and II respectively:

| | I<br>Diazo-component | II<br>Coupling component | III<br>Color of dyeings on wool from a neutral or acetic acid bath |
|---|---|---|---|
| 1 | 5-Chloracetylamino-2-aminobenzene-1-sulfonic acid. | 2-amino-8-hydroxy-naphthalene-6-sulfanilide. | red. |
| 2 | ----do---- | 2-amino-8-hydroxy-naphthalene-6-sulfonic acid-2'-methyl-phenylamide. | Do. |
| 3 | ----do---- | 2-amino-8-hydroxy-naphthalene-6-sulfonic acid-2':6'-dimethyl-phenylamide. | Do. |
| 4 | ----do---- | 2-amino-8-hydroxy-naphthalene-6-sulfonic acid-N-β-hydroxyethyl-anilide. | Do. |
| 5 | ----do---- | 2-methylamino-8-hydroxynaphthalene-6-sulfonic acid-N-methyl-anilide. | bluish red. |
| 6 | ----do---- | 1-aminonaphthalene-5-sulfonic acid-methylamide. | reddish orange. |
| 7 | ----do---- | 2-aminonaphthalene-6-sulfonic acid-N-methyl anilide. | yellowish orange. |
| 8 | ----do---- | 2-aminonaphthalene-6-methyl sulfone. | Do. |
| 9 | 5-β-chlorpropionyl-amino-2-aminobenzene-1-sulfonic acid. | 2-amino-8-hydroxy-naphthalene-6-sulfonic acid-N-methylanilide. | red. |

Example 2

18 parts of the dyestuff of the formula

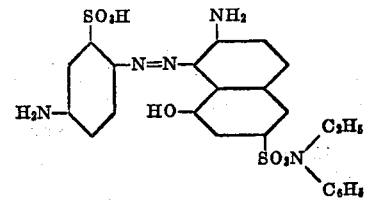

which can be obtained by coupling diazotized 5-nitro-2-aminobenzene-1-sulfonic acid with 2-amino-8-hydroxy-naphthalene-6-sulfonic acid-N-ethyl anilide in acid solution and reducing the nitro-dyestuff so obtained with sodium sulfide, are heated with 30 parts of chloracetyl chloride with the exclusion of moisture for 12 hours at 70–75° C. The reaction product is mixed with 300 parts of water and with sodium carbonate to give a reaction neutral to Congo. The dyestuff precipitates out and can be isolated and worked up in the usual manner. It dyes wool from acetic acid baths somewhat bluish red tints having very good properties of fastness. The dyestuff has the formula

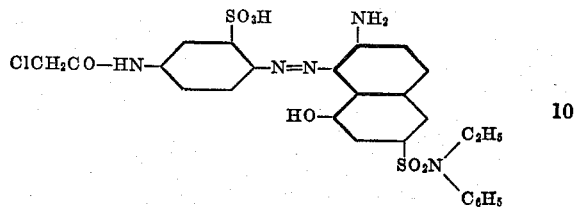

The dyestuff can also be obtained in a manner analogous to that described in Example 1 from diazotized 5-chloracetylamino-2-aminobenzene-1-sulfonic acid and 2-amino-8-hydroxynaphthalene-6-sulfonic acid-N-ethyl anilide.

This application is a division of application Serial No. 524,274, filed July 25, 1955, and issued June 2, 1959, as Patent No. 2,889,316.

What is claimed is:

1. A monoazo dyestuff corresponding to the formula

wherein R represents the radical of a 2-aminonaphthalene sulfonic acid amide bound to the azo linkage in 1-position, $R_1$ represents a benzene radical containing the single sulfonic acid group present in the dyestuff molecule and X represents an amino group bearing the acyl radical of an aliphatic acid containing in one of the positions $\beta$ and $\alpha$ a chlorine atom.

2. A monoazo dyestuff which in its free acid state corresponds to the formula

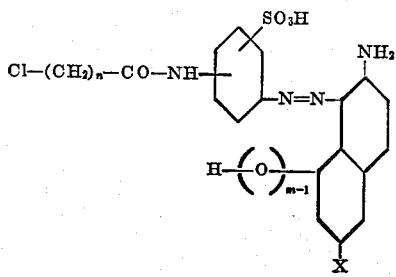

wherein X represents a sulfonic acid amide group, $n$ and $m$ representing a whole number up to 2.

3. A monoazo dyestuff which in its free acid state corresponds to the formula

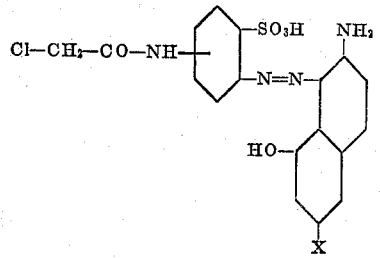

wherein X represents a sulfonic acid amide group.

4. The monoazo dyestuff which in its free acid state corresponds to the formula

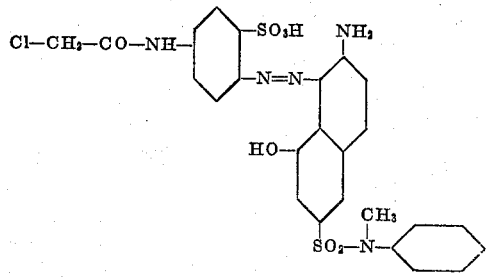

References Cited in the file of this patent

UNITED STATES PATENTS

| | | |
|---|---|---|
| 1,903,599 | Schweitzer | April 11, 1933 |
| 2,374,157 | Kvalnes | April 17, 1945 |
| 2,817,655 | Schetty et al. | Dec. 24, 1957 |

OTHER REFERENCES

Venkataraman: Synthetic Dyes, pp. 539 and 540, vol. I (1952).

UNITED STATES PATENT OFFICE
CERTIFICATE OF CORRECTION

Patent No. 2,931,795                          April 5, 1960

Alphonse Heckendorn et al.

It is hereby certified that error appears in the printed specification of the above numbered patent requiring correction and that the said Letters Patent should read as corrected below.

Column 2, line 3, for "-cyclohexl-" read ---cyclohexyl- --; line 19, for "alphatic" read -- aliphatic --; column 6, lines 20 to 24, the upper left-hand portion of the formula should appear as shown below instead of as in the patent:

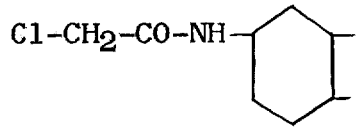

Signed and sealed this 13th day of September 1960.

(SEAL)
Attest:

KARL H. AXLINE                                    ROBERT C. WATSON
Attesting Officer                                Commissioner of Patents